(12) United States Patent
Xiong et al.

(10) Patent No.: US 11,970,393 B2
(45) Date of Patent: Apr. 30, 2024

(54) DECOMPOSITION MEDIATION IN CHLORINE DIOXIDE GENERATION SYSTEMS THROUGH SOUND DETECTION AND CONTROL

(71) Applicant: ECOLAB USA INC., St. Paul, MN (US)

(72) Inventors: Kun Xiong, Naperville, IL (US); Nicholas Ryan Denny, Glen Ellyn, IL (US); Stephen Joseph Hinterlong, Elburn, IL (US); Emily Rader, Knoxville, TN (US); David R. Papanek, Glenshaw, PA (US); Shawn Dalke, Sugar Grove, IL (US)

(73) Assignee: ECOLAB USA Inc., St. Paul, MN (US)

( * ) Notice: Subject to any disclaimer, the term of this patent is extended or adjusted under 35 U.S.C. 154(b) by 226 days.

(21) Appl. No.: 16/502,458

(22) Filed: Jul. 3, 2019

(65) Prior Publication Data

US 2020/0010319 A1    Jan. 9, 2020

Related U.S. Application Data

(60) Provisional application No. 62/694,071, filed on Jul. 5, 2018.

(51) Int. Cl.
*C01B 11/02* (2006.01)
*B01J 4/00* (2006.01)
*B01J 19/00* (2006.01)

(52) U.S. Cl.
CPC .............. *C01B 11/026* (2013.01); *B01J 4/001* (2013.01); *B01J 19/002* (2013.01); *B01J 2204/002* (2013.01)

(58) Field of Classification Search
CPC ........................... C01B 11/023; C01B 11/022
See application file for complete search history.

(56) References Cited

U.S. PATENT DOCUMENTS

| 2,614,645 A | 10/1952 | Wilhelm |
| 2,833,624 A | 5/1958 | Sprauer |

(Continued)

FOREIGN PATENT DOCUMENTS

| CA | 2539984 A1 | 9/2005 |
| CN | 1488571 | 4/2004 |

(Continued)

OTHER PUBLICATIONS

DuPont™ Oxone® Monopersulfate Compound (K20101), The Right Choice for Oxidation, 3 pages (2008).

(Continued)

*Primary Examiner* — Anita Nassiri-Motlagh
(74) *Attorney, Agent, or Firm* — Eric D. Babych; Barnes & Thornburg LLP

(57) ABSTRACT

A method of controlling a chemical reaction is disclosed. The method may include feeding a solution at a first flow rate into a reactor and detecting a sound in the reactor using a sound sensor that is adjacent to the reactor. The sound sensor may convert the sound into a sound signal. After the sound signal is acquired, it is compared to a stored sound signal or a stored sound threshold to detect a reaction event. The method may include adjusting the flow rate of solutions into the reactor in response to the reaction event.

17 Claims, 6 Drawing Sheets

(56) References Cited

U.S. PATENT DOCUMENTS

| | | |
|---|---|---|
| 2,971,896 A | 2/1961 | Curl |
| 3,502,443 A | 3/1970 | Westerlund |
| 3,946,600 A * | 3/1976 | Rettig .................... G01H 1/00 73/587 |
| 4,250,144 A | 2/1981 | Ratigan |
| 4,452,747 A * | 6/1984 | Gersonde ............ A61K 9/1277 264/4.1 |
| 4,590,057 A | 5/1986 | Hicks |
| 4,678,655 A | 7/1987 | Twardowski |
| 4,790,943 A | 12/1988 | Dunn et al. |
| 4,886,653 A | 12/1989 | Gasper et al. |
| 5,091,166 A | 2/1992 | Engstrom et al. |
| 5,227,031 A | 7/1993 | Sundblad |
| 5,273,733 A | 12/1993 | Winters et al. |
| 5,366,714 A | 11/1994 | Bigauskas |
| 5,376,350 A | 12/1994 | Tenney et al. |
| 5,380,517 A | 1/1995 | Sokol |
| 5,380,518 A | 1/1995 | Roozdar |
| 5,399,288 A | 3/1995 | Marzouk et al. |
| 5,399,332 A | 3/1995 | Pu |
| 5,813,998 A | 9/1998 | Dias |
| 5,855,861 A | 1/1999 | Lee |
| 5,858,322 A | 1/1999 | Gray |
| 5,863,584 A | 1/1999 | Thomas, Jr. et al. |
| 5,895,638 A | 4/1999 | Tenney |
| 5,906,943 A | 5/1999 | Skorpik et al. |
| 5,968,454 A | 10/1999 | Deacon et al. |
| 6,385,558 B1 | 5/2002 | Schlemm |
| 6,387,344 B1 | 5/2002 | Tenney et al. |
| 6,428,696 B2 | 8/2002 | Küke |
| 6,468,479 B1 | 10/2002 | Mason et al. |
| 6,790,427 B2 | 9/2004 | Charles et al. |
| 6,840,251 B2 | 1/2005 | Gill et al. |
| 7,322,243 B2 | 1/2008 | Liu et al. |
| 7,407,642 B2 | 8/2008 | Mussari et al. |
| 7,452,511 B2 | 11/2008 | Schmitz et al. |
| 7,498,720 B2 | 3/2009 | Loebl et al. |
| 7,507,317 B2 | 3/2009 | Babchin et al. |
| 7,998,538 B2 | 8/2011 | Greengard et al. |
| 8,168,153 B2 | 5/2012 | Sokol et al. |
| 8,318,476 B2 | 11/2012 | Parker et al. |
| 8,486,276 B2 | 7/2013 | Duve |
| 8,647,598 B2 | 2/2014 | Grimland et al. |
| 8,691,154 B2 | 4/2014 | Sperry et al. |
| 8,784,733 B2 | 7/2014 | Alarid et al. |
| 9,061,927 B2 | 6/2015 | Belluati et al. |
| 9,238,587 B2 | 1/2016 | Mason |
| 9,743,670 B2 | 8/2017 | Grund |
| 10,501,345 B2 | 12/2019 | Xiong et al. |
| 11,225,421 B2 | 1/2022 | Xiong et al. |
| 2002/0014463 A1 | 2/2002 | Iverson et al. |
| 2003/0031621 A1 | 2/2003 | Gravitt et al. |
| 2003/0091497 A1 | 5/2003 | Mason et al. |
| 2003/0200997 A1 | 10/2003 | Gill et al. |
| 2003/0203827 A1 | 10/2003 | Cooper et al. |
| 2004/0175322 A1 | 9/2004 | Woodruff et al. |
| 2005/0008554 A1 | 1/2005 | Nowosielski-Slepowron et al. |
| 2005/0150520 A1 | 6/2005 | Gill et al. |
| 2005/0186131 A1 | 8/2005 | Charles et al. |
| 2005/0244328 A1 | 11/2005 | Schmitz et al. |
| 2006/0021872 A1 | 2/2006 | O'Leary et al. |
| 2006/0051285 A1 | 3/2006 | Hawker et al. |
| 2006/0133983 A1 | 6/2006 | Charles et al. |
| 2007/0116637 A1 | 5/2007 | Woodruff et al. |
| 2007/0237708 A1 | 10/2007 | Woodruff et al. |
| 2009/0159538 A1 | 6/2009 | Duve |
| 2010/0063309 A1 | 3/2010 | Bunning et al. |
| 2010/0155341 A1 | 6/2010 | Duve |
| 2011/0182800 A1 | 7/2011 | Hultén et al. |
| 2011/0262342 A1 | 10/2011 | Richardson et al. |
| 2012/0021062 A1 | 1/2012 | Gupta et al. |
| 2012/0183469 A1 | 7/2012 | Mussari |
| 2012/0294794 A1 | 11/2012 | Pelin |
| 2012/0305494 A1 | 12/2012 | DiMascio |
| 2013/0015113 A1 | 1/2013 | Mussari |
| 2013/0106003 A1 | 5/2013 | Duve |
| 2013/0209349 A1 | 8/2013 | Vilhelmsson et al. |
| 2014/0138325 A1 | 5/2014 | Tomsheck |
| 2014/0299552 A1 | 10/2014 | Stewart et al. |
| 2014/0302176 A1 | 10/2014 | Grund et al. |
| 2014/0305881 A1 | 10/2014 | Alarid et al. |
| 2015/0021276 A1 | 1/2015 | Rahkola et al. |
| 2015/0065403 A1 * | 3/2015 | Martin .................... C02F 1/68 507/269 |
| 2016/0029639 A1 | 2/2016 | DiMascio et al. |
| 2017/0064949 A1 | 3/2017 | Kraus et al. |
| 2019/0390990 A1 * | 12/2019 | Krywyj ............... G01N 29/041 |

FOREIGN PATENT DOCUMENTS

| | | |
|---|---|---|
| CN | 2649570 Y | 10/2004 |
| CN | 2654587 Y | 11/2004 |
| CN | 2700312 Y | 5/2005 |
| CN | 100405027 C | 7/2008 |
| CN | 101983176 A | 3/2011 |
| CN | 202880867 U | 4/2013 |
| CN | 105752931 A | 7/2016 |
| CN | 205472644 U | 8/2016 |
| DE | 102008042424 A1 | 6/2009 |
| DE | 102010027840 A1 | 10/2011 |
| EP | 0119686 | 9/1984 |
| EP | 0850875 A1 | 7/1998 |
| EP | 2581340 A1 | 4/2013 |
| EP | 3601157 B9 | 8/2021 |
| FR | 2949908 A1 | 3/2011 |
| GB | 1056790 | 1/1967 |
| JP | H03-83802 | 4/1991 |
| TW | 200535088 A | 11/2005 |
| TW | 200927670 A | 7/2009 |
| WO | WO 2001/077012 A1 | 10/2001 |
| WO | WO 2003/000586 A1 | 1/2003 |
| WO | WO 2006/062455 A1 | 6/2006 |
| WO | WO 2008/058206 A2 | 5/2008 |
| WO | WO 2008/125075 A1 | 10/2008 |
| WO | 2011131389 A1 | 10/2011 |
| WO | 2013/048899 A2 | 4/2013 |
| WO | WO 2016/140772 A1 | 9/2016 |
| WO | WO 2016/145487 A1 | 9/2016 |

OTHER PUBLICATIONS

Dupont™ Oxone® Monopersulfate Compound (k20102), General Technical Atributes, 4 pages (2008).

International Search Report and Written Opinion of International Application No. PCT/US2018/019660, 10 pages (dated May 16, 2018).

International Search Report and Written Opinion of International Application No. PCT/US2018/023784, 13 pages (dated Jul. 6, 2018).

International Search Report and Written Opinion of International Application No. PCT/US2018/023798, 12 pages (dated Jul. 6, 2018).

Katz, J., "Ozone and Chlorine Dioxide Technology for Disinfection of Drinking Water," Pollution Technology Review, No. 67, 669 Pages, ISBN-10:0815508026; ISBN-13: 978-081550821 (1980).

Wastewater Disinfection-MOP FD-10, Water Enviroment Federation, Alexandria, VA; Report No. MFD10GT, 300p; Accession No. WEF0009 (1996).

Yin, G., et al., "Addition of H2O2 to a methanol based ClO2 generator to decrease Cl2 emission: Mills trials resulted in a 60% reduction in chlorine emissions from stack gases,"*Pulp & Paper Canada*, 104(5):62-64 (2003), Abstract only.

Zhang, Jiku., et al., "Study of manufacturing high pure chlorine dioxide with multi-stage compound chlorine dioxide generator," *Advanced Materials Research*, 550-553:3125-3130 (2012), Abstract only.

Detsch, Richard M. et al. "Sound amplification from controlled excitation reactions: Experimental observations in chemically reacting H2/Cl2 mixtures," Journal of the Acoustical Society of America (Feb. 1985), 77(2), pp. 512-519.

(56) References Cited

OTHER PUBLICATIONS

Smith, James A. "Using the sounds of nuclear power," Journal of the Acoustical Society of America (2016), 139, p. 2159. (English Abstract only.).

* cited by examiner

Seconds

DECOMPOSITION MEDIATION IN CHLORINE DIOXIDE GENERATION SYSTEMS THROUGH SOUND DETECTION AND CONTROL

BACKGROUND

1. Field of the Invention

The present disclosure generally relates to controlling chemical reactions. More particularly, the disclosure relates to mitigating decomposition and unwanted side reactions in chlorine dioxide generating systems.

2. Description of the Related Art

Chlorine dioxide in solution is unstable with an extremely short shelf life and thus is not commercially available. Chlorine dioxide solutions typically must be generated at its point of use such as, for example, by a reaction between a metal chlorate or metal chlorite in aqueous solution and a liquid phase strong acid. Production of chlorine dioxide using chlorate, hydrogen peroxide, and acid generates heat and may result in inadvertent explosive decomposition of chlorine dioxide if the reaction is not properly controlled.

BRIEF SUMMARY

In some embodiments, a method of controlling a chemical reaction is disclosed. The method may include feeding a solution into a reactor, the solution having a first flow rate; detecting a sound in the reactor using a sound sensor that is adjacent to the reactor, wherein the sound sensor converts the sound into a sound signal; comparing the sound signal to a stored sound signal or a stored sound threshold to detect a reaction event; and adjusting the first flow rate to a second flow rate of the solution in response to the reaction event.

In some embodiments, the method may include calculating an envelope signal of the sound signal and the stored sound signal comprises a stored envelope signal.

In some embodiments, the method may include comparing a slope of the envelope signal to a slope of the stored envelope signal.

In some embodiments, the stored sound signal can include a sound profile of a discontinuing reaction.

In some embodiments, the stored sound signal may include a decibel threshold.

In some embodiments, the stored sound signal may include a first stored signal and a second stored signal, the first stored signal being a decibel threshold and the second stored signal being a sound profile of a discontinuing reaction.

In some embodiments, the method may include comparing the sound signal to the decibel threshold and to the sound profile of the discontinuing reaction.

In some embodiments, the reaction event may be selected from a decomposition event, reaction discontinuation, reaction initiation, and any combination thereof.

In some embodiments, a detecting portion of the sound sensor is not in contact with the reactor.

In some embodiments, the reaction event may be a decomposition event.

In some embodiments, the method may include detecting ambient sound around the reactor using an ambient sound sensor and comparing an ambient sound signal to the sound signal.

In some embodiments, the ambient sound sensor may be directed opposite to the reactor.

In some embodiments, the solution may include a first solution, a second solution, and a third solution fed separately into the reactor, the first solution may include an acid, the second solution may include chlorite or chlorate, and the third solution may be water.

In some embodiments, the acid may be hydrochloric acid or sulfuric acid.

In some embodiments, the reactor may produce chlorine dioxide.

In some embodiments, the reactor may be a plug flow reactor.

In some embodiments, the reactor may include a mixing device; a first feed line in fluid communication with the mixing device; a second feed line in fluid communication with the mixing device; and a reactor comprising a proximal portion in fluid communication with the mixing device and a distal portion in fluid communication with a motive water line. The mixing device, the reactor, a portion of the first feed line, and a portion of the second feed line may be positioned within the motive water line.

In some embodiments, the reactor may have a coiled configuration having a coil plane angle of about 1 degrees to about 60 degrees.

In some embodiments, the first feed line and the second feed line are opposite to and directed against each other.

In some embodiments, the reactor may have at least one contact zone, wherein the contact zone may have an inner diameter at least two times larger than an inner diameter of the reactor.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
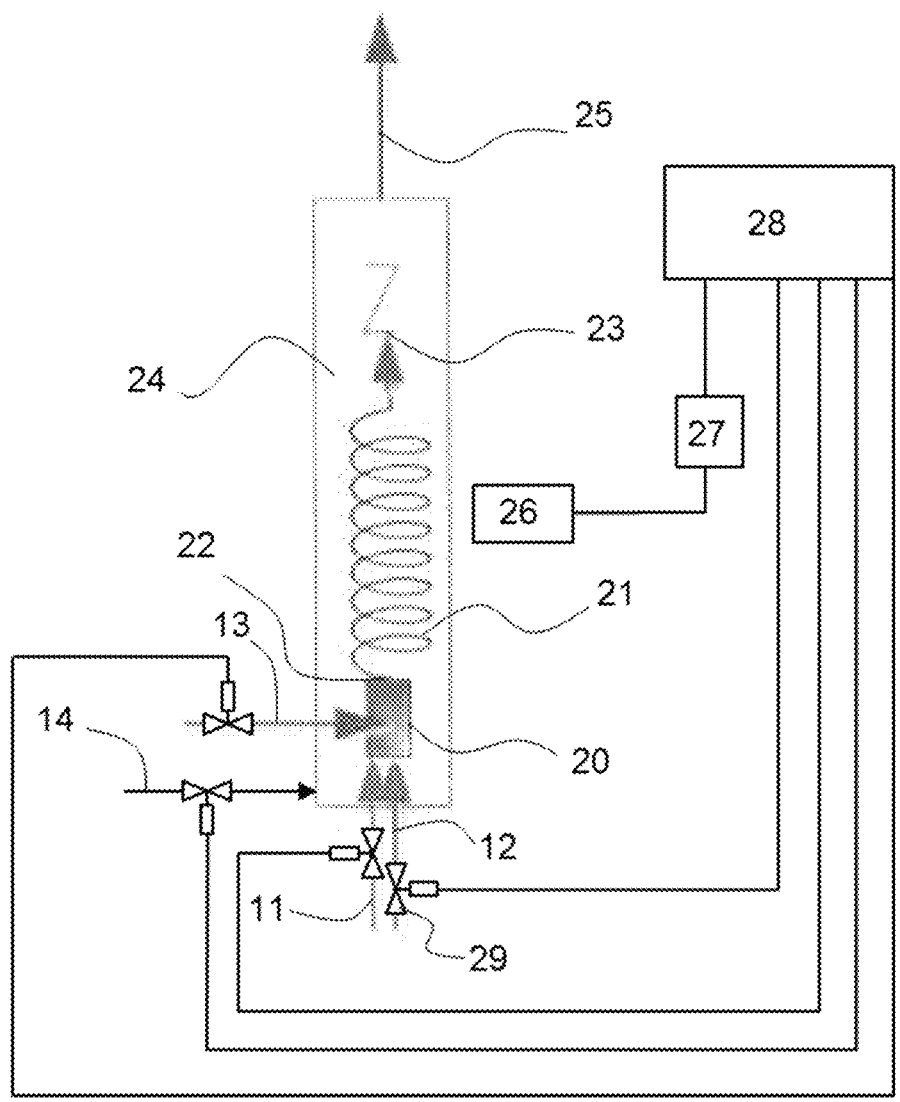
FIG. 1 shows a system for detecting sound in a reactor and controlling feed rates of solutions into a reactor.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

A method of controlling a chemical reaction is disclosed. The method may include feeding a solution at a first flow rate into a reactor. The method may include detecting a sound in the reactor using a sound sensor that is adjacent to the reactor. The sound sensor may convert the sound into a sound signal. After the sound signal is acquired, it is compared to a stored sound signal or a stored sound threshold to detect a reaction event. The method may include adjusting the first flow rate to a second flow rate of the solution in response to the reaction event.

The stored sound signal may include a sound profile of a reaction event. The reaction event can include, for example a decomposition event, reaction discontinuation, reaction initiation, or any combination thereof. The stored sound signal may include a sound profile of a discontinuing reaction. Each reaction event can have a distinct sound profile that may be stored in a computer or controller. The sound profile of any of the reaction events can be acquired by recording the sound signal of reactions undergoing a reaction event.

In some embodiments, the stored sound signal may include a decibel threshold. The decibel threshold can be set before any reaction events are detected. Any sound detected in the reactor that registers above the decibel threshold may indicate that a reaction event has occurred or is occurring. A decibel threshold can be from about 40 to about 120 dB.

The stored sound signal may include a first stored signal and a second stored signal. The first stored signal may be a decibel threshold and the second stored signal may be a sound profile of a discontinuing reaction.

In some embodiments, the method may include comparing the sound signal to the decibel threshold and to the stored sound profile of the discontinuing reaction.

In some embodiments, the stored sound signal may include information relating to amplitude, frequency, duration, or any combination thereof. For example, a specific reaction event can be characterized by certain changes in amplitude, frequency, or duration of the sound signal. In some cases, the reaction event can be identified in the sound signal after processing the sound signal using known methods in the art such as, for example, Fourier transforms, cross correlations, curve fitting, or machine learning.

The method may include calculating an envelope signal of the sound signal. The signal detected from the reactor may be an oscillating signal having a maximum and a minimum for each peak in the oscillating signal. The envelope signal may be a smooth curve outlining the peak maxima to generate an upper envelope. The envelope signal may be a smooth curve outlining the peak minima to generate a lower envelope. The envelope signal may include the upper envelope and the lower envelope.

The stored sound signal may include a stored envelope signal. The stored envelope signal may include the upper and lower envelope of a sound signal detected during a reaction event. Similarities between the stored envelope signal and the real-time envelope signal may indicate that a reaction event is occurring. For example, certain envelope signal characteristics can be used to compare signals such as the slope of the envelope, size of the envelope (distance between upper and lower envelope signal), and duration of the envelope signal.

The method may include comparing a slope of the envelope signal to a slope of the stored envelope signal. The method may include comparing the size of the envelope signal to the size of the stored envelope signal. The method may include comparing the duration of the envelope signal to the duration of the stored envelope signal.

The stored envelope signal may be an envelope calculated from a sound signal of a reaction that is stopping due to decomposition in a chlorine dioxide generation system. Chlorine dioxide decomposition may be associated with a loud audible sound followed by lower continuous sounds if a chain decomposition reaction happens in the reactor. These sounds provide a unique sound profile that can be used to identify decomposition events and either prevent or mitigate chlorine dioxide decomposition.

Statistical tools can be used to determine the similarity between sound signals in order to identify reaction events. For example, the slope of the envelope signal can be compared to the slope of the stored envelope signal to determine whether the envelope signals falls within a certain confidence interval for statistical significance. One of ordinary skill in the art would be able to select the statistical criteria from widely known and available statistical tools by which sound signals can be analyzed to identify reaction events.

Once the sound from the reactor has been identified, an analog or digital output can be produced by the listening system and sent to a reaction control system. The reaction control system may include a programmable logic controller (PLC). Control signals can be sent to stop the unwanted event and/or restart the reaction. The listening system can include the sound sensor that is adjacent to the reactor.

The sound sensor can be a microphone that converts sound into an electrical signal. Examples of types of microphones include, but are not limited to, dynamic microphones, condenser microphones, piezoelectric microphones, or fiber optic microphones.

In some embodiments, a detecting portion of the sound sensor is not in contact with the reactor. It is not required that the detecting portion of the sound sensor be in physical contact with the reactor. An air space may be between the sound sensor and the reactor without impairing the detection of reaction events and control of the reaction.

The sound sensors may be positioned adjacent to a contact zone of the reactor. The reactor may include at least one contact zone. The contact zone may have an inner diameter at least two times larger than an inner diameter of the reactor. As the reaction mixture flows through the reactor it may reach a contact zone where the reaction mixture may further mix. The outlet of the contact zone may narrow to the diameter of the reactor. In some embodiments, the reactor may include at least two, three, four, or more contact zones. In other embodiments, the contact zone may comprise an inner diameter at least about two times larger than an inner diameter of the reactor. In some embodiments, the contact zone may comprise an inner diameter at least about three, four, or five times larger than an inner diameter of the reactor.

In some embodiments, multiple sound sensors can be used in the system for identifying sound from the reactor or surroundings, eliminating false environmental sound and confirming the sounds produced in the reactor.

The method may include detecting ambient sound around the reactor using an ambient sound sensor and comparing an ambient sound signal to the sound signal. The ambient sound sensor may be directed opposite to the reactor. The sound signal can be corrected using known signal analysis tools to remove the ambient sound signal to further enhance the ability to identify a reaction event correctly and reduce false positives.

The sound sensor may be in communication with a process control system including a PLC. The PLC may be in communication with feed pump controls. The feed pump controls may manipulate valves or pumps that allow reactants or diluents to flow into the reactor.

The pumps used to feed the first and second solutions may be in communication with the PLC. The PLC may also be in communication with any pumps placed on a product feed line.

In some embodiments, the reactor may be in fluid communication with at least one product feed line. Pumps may be placed on each one of the product feed lines, or in some embodiments, multiple product feed lines may share a single pump.

The PLC may be in communication with other sensors such as, for example, pressure sensors, temperature sensors, or flow meters. The flow meters that may be used with the disclosed methods may be any suitable flow meter, such as but not limited to clamp-on or pulse flow meters. Pulse-based flow meters detect the kinetic energy of flowing fluid using optical or magnetic sensors and converting it into electrical energy in the form of digital pulses. The flow rate can be determined by measuring the periods of the pulses.

In some embodiments, the flow rate of any solutions being fed into the reactor may be determined using at least two flow meters that measure the flow rate based on different principles to ensure that an accurate amount of precursor chemical is being fed into the reactor.

In some embodiments, any of the methods disclosed herein may include sensing a reactor pressure. In some embodiments, the product feed lines may be equipped with a check valve, flow meter, and feed pump.

Multiple alarms and failsafe settings may be set using the PLC. If a reaction event is detected, an alarm may sound or failsafes can be activated to prevent further adverse reaction events.

Some failsafes may include pressure relief valves on the reactor or product feed lines. Any of the feed lines may have a pressure sensor that communicates readings to the main control device. By way of example, the main control device may include a PLC and an Adam AI/AO (analog input/analog output) module. If the reactor is housed in a cabinet, then the cabinet may have leak detection sensors and a cabinet door lock.

In addition to detecting reaction events using a sound sensor, other reaction conditions can be monitored and controlled. For example, pump issues may be detected by monitoring the differential between the flow meter readings and the pump rate calculations.

The reactor may include a mixing device, a first feed line in fluid communication with the mixing device, a second feed line in fluid communication with the mixing device, and a reactor comprising a proximal portion in fluid communication with the mixing device and a distal portion in fluid communication with a motive water line. The mixing device, the reactor, a portion of the first feed line, and a portion of the second feed line may be positioned within the motive water line.

The reactor may be a plug flow reactor.

The reactor may have a length in a range from about 25 inches to about 300 inches. In some embodiments, the reactor may have a length in a range from about 30 inches to about 90 inches, about 30 inches to about 80 inches, about 30 inches to about 70 inches, about 30 inches to about 60 inches, about 30 inches to about 50 inches, about 40 inches to about 90 inches, about 40 inches to about 80 inches, about 35 inches to about 45 inches, or about 35 inches to about 60 inches. In other embodiments, the reactor may be about 40 inches in length.

In some embodiments, the reactor may have an inner diameter in a range from about 0.1 inches to about 4 inches. In some embodiments, the reactor may have an inner diameter in a range from about 1 inch to about 1.25 inches, or about 0.25 inches to about 1.25 inches. In some embodiments, the reactor may have an inner diameter of about 0.25 inches, about 2 inches, about 3 inches, or about 4 inches. In other embodiments, the reactor may have an inner diameter of about 1.25 inches, about 1 inch, about 0.75 inches, about 0.375 inches, or about 0.1875 inches.

The reactor may be positioned horizontally, vertically, or any angle in between. In some embodiments, the reactor may be positioned vertically. In embodiments in which the reactor is a coiled reactor, the reactor may spiral upward.

In some embodiments, the reactor can include a coiled configuration having a coil plane angle of about 1 degrees to about 60 degrees. A coiled configuration may further increase mixing and enhance mixing. In some embodiments, the coil plane angle may be from about 5 to about 30 degrees. The reactor having a coiled configuration may include a coil diameter. The coil diameter may be in a range from about 0.1 to about 16.0 inches, about 1 inch to about 16 inches, about 2 inch to about 16 inches, about 2 inch to about 10 inches, or about 2 inches to about 4 inches.

The reactor may produce chlorine dioxide. However, the methods disclosed herein are not limited to chlorine dioxide production. Other chemical reactions can be controlled using the disclosed methods.

The method may include feeding a first solution comprising an acid through a first feed line into a mixing device and feeding a second solution comprising chlorate and hydrogen peroxide through a second feed line into the mixing device. The first and second solutions may then be mixed in the mixing device to form a reaction mixture. A reactor may be in fluid communication with the mixing device. After mixing, the reaction mixture may be fed into the reactor. The acid, chlorate, and hydrogen peroxide may react in the reactor, thereby producing chlorine dioxide. The reactor may include a proximal portion in fluid communication with the mixing device and a distal portion in fluid communication with a motive water line. The mixing device, the reactor, a portion of the first feed line, and a portion of the second feed line may be positioned within the motive water line. As the reaction mixture exits the reactor, the reaction mixture may mix with motive water in the motive water line at the distal portion of the reactor. The mixed chlorine dioxide and motive water may be injected into the process water.

The solution may include a first solution, a second solution, and a third solution fed separately into the reactor, the first solution comprises an acid, the second solution comprises chlorite or chlorate, and the third solution is water.

The acid may be hydrochloric acid or sulfuric acid.

The first solution may consist of or comprise sulfuric acid and water, wherein the sulfuric acid concentration ranges from about 50% by weight to about 98% by weight. The sulfuric acid concentration in the first solution may be about 78% by weight. In some embodiments, the second solution may comprise or consist of chlorate, hydrogen peroxide, and water. The second solution may comprise a concentration of chlorate that is in a range of about 25% by weight to about 60% by weight. The concentration of chlorate in the second solution may be about 40% by weight. The concentration of hydrogen peroxide in the second solution may be in the range of about 2% by weight to about 30% by weight. The concentration of hydrogen peroxide in the second solution may be about 8% by weight. In some embodiments, the acid may be sulfuric acid and the chlorate may be sodium chlorate.

In some embodiments, the first solution may consist of or comprise hydrochloric acid and water, wherein the hydrochloric acid concentration ranges from about 5% by weight to about 38% by weight. The hydrochloric acid concentration in the first solution may be about 37%. In some embodiments, the second solution may consist of or comprise a chlorite and water. The second solution may have a chlorite concentration that ranges from about 5% by weight to about 60% by weight. The chlorite concentration in the second solution may be about 25% by weight. In some embodiments, the chlorite may be sodium chlorite.

At least two feed lines may carry precursor chemicals to the mixing device. The precursors may include the first and second solutions. In other embodiments, a third feed line may feed water or other chemicals to the mixing device. In some embodiments, the feed lines to the mixing device may consist of a first feed line and a second feed line.

The first feed line and the second feed line can be opposite to and directed against each other as in a "T" configuration. In this configuration, the solutions fed through the first and second feed lines may collide and mix.

In some embodiments, the acid, the chlorate, and the hydrogen peroxide may form a reaction mixture in the mixing device. The first and second solutions may combine to form the reaction mixture. At least one advantage of using a solution of chlorate and hydrogen peroxide to react with an acid solution is that no chlorine gas is produced. The absence of chlorine gas provides a safer and more economical process.

In certain embodiments, the reaction mixture may have a residence time in the reactor of at least about 0.1 minute. In some embodiments, the reaction mixture may have a residence time in the reactor of at least about 1 minute. In other embodiments, the reaction mixture may reside in the reactor for at least about 3 minutes, at least about 4 minutes, at least about 5 minutes, at least about 6 minutes, at least about 7 minutes, at least about 8 minutes, at least about 9 minutes, or at least about 10 minutes. In some embodiments, the reaction mixture may have a residence time in the reactor of about 3.8 minutes. Residence time may be calculated by dividing total reactor volume by total precursor flow rate.

In some embodiments, the precursors (acid and chlorate/hydrogen peroxide or chlorite) may be fed into the mixing device at a flow velocity of about 25 cm/minute. In some embodiments, the precursors may be fed into the mixing device at a flow velocity in a range from about 20 cm/minute to about 200 cm/minute, about 20 cm/minute to about 65 cm/minute, or about 20 cm/minute to about 50 cm/minute. In some embodiments the precursor velocity may be about 25 cm/minute, about 50 cm/minute, or about 65 cm/min. Precursor velocity can be calculated by dividing total precursor flow rate by the cross-sectional area of the reactor.

In other embodiments, the reactor may be operated at a pressure about equal to or greater than atmospheric pressure.

The method may further include the step of cooling the mixing device and the reactor with the motive water. The motive water passing through the motive water line may serve to control the temperature of the solutions in the feed lines and the temperature of the reaction mixture.

In some embodiments, the diameter of the motive water line may be larger than the diameter of the reactor and the first and second feed lines such that the reactor and the feed lines may be positioned in the lumen of the motive water line.

In some embodiments, the motive water line may comprise at least two channels. The channels may be longitudinal. In some embodiments, the motive water line may be a double containment pipe. The motive water line may have an inner channel and an outer channel through which motive water may flow, and the reactor may be positioned within the inner channel. The motive water flow rate in the outer channel may be different than the flow rate of the motive water in the inner channel. The motive water flow rate in the inner channel may be such that the temperature of the reaction mixture is controlled within a certain range. The reaction mixture temperature may be about 2° C. to about 80° C., about 2° C. to about 70° C., about 35° C. to about 70° C., about 40° C. to about 70° C., or about 50° C. to about 70° C. The reaction mixture temperature may be about 60° C. The temperature of the motive water in the outer channel may be different from the temperature of the motive water in the inner channel. The outer channel may contain motive water having a flow rate sufficient to dilute the chlorine dioxide to a safe concentration such as less than about 3,000 ppm, less than about 2,000 ppm, less than about 1,500 ppm, less than about 1,000, less than about 750 ppm, less than about 500 ppm, less than about 250 ppm, less than about 100 ppm, or less than about 50 ppm.

In some embodiments, the method may include withdrawing chlorine dioxide using an eductor. In some embodiments, the methods disclosed do not use an eductor to withdraw chlorine dioxide from the reactor. In some embodiments, the reactor does not comprise an educator.

In some embodiments, the method may include operating the reactor at a temperature in a range from about 2° C. to about 80° C. In some embodiments, the method may include operating the reactor at a temperature of about 60° C.

In some embodiments, the temperature of the motive water may be in a range from about 2° C. to about 80° C. The motive water temperature may be in range from about 15° C. to about 70° C., about 30° C. to about 70° C., about 40° C. to about 70° C., about 40° C. to about 60° C., or about 50° C. to about 70° C.

In some embodiments, the chlorine dioxide may be produced at a rate in a range from about 0.001 lb/hour to about 20 lb/hour. In some embodiments, the chlorine dioxide may be produced at a rate in a range from about 0.02 lb/hour to about 15 lb/hour. In some embodiments, the chlorine dioxide may be produced at a rate in a range from about 5 lb/hour to about 15 lb/hour. As chlorine dioxide is produced at a higher rate, a larger diameter reactor may be used to ensure that the residence time in the reactor is at least about 3 minutes. In some embodiments, the residence time in the reactor may be at least about 2 minutes.

Referring to FIG. 1, a schematic showing a system for controlling a chemical reaction is shown. The first feed line 11 and the second feed line 12 may introduce precursor chemicals into a mixing device 20. In some embodiments, a water line 13 may feed water into the mixing device 20. A motive feed line 14 may supply water to the motive water line 24. In other embodiments, the water in the motive water line 24 dilutes and mixes with the chlorine dioxide at the distal portion 23 of the reactor 21. The proximal portion of the reactor 22 may be connected to the mixing device 20.

Fluid in the mixing device 20 may flow out of the mixing device 20 and into the reactor 21. A product line 25 withdraws product from the reactor. A sound sensor 26 may be positioned adjacent to the reactor 21. The sound sensor 26 may be connected to a signal processor 27 which is connected to a PLC 28. The PLC 28 may be connected to a valve 29 that controls the flow of precursors in the first feed line 11, second feed line 12, water line 13, or motive feed line 14.

Figure 2:
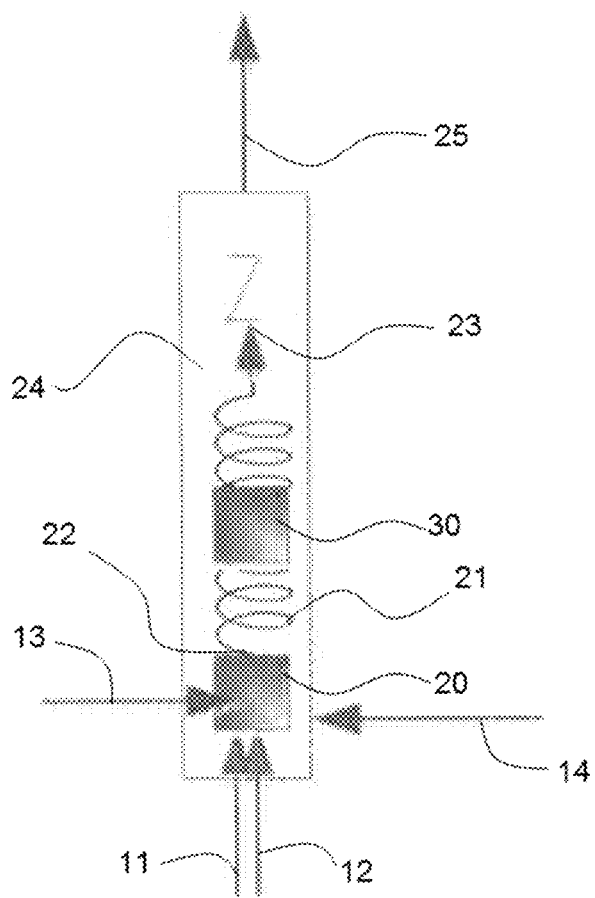
FIG. 2 shows an embodiment of a chlorine dioxide mixer and reactor.

FIG. 2 shows an embodiment in which the reactor has at least one contact zone 30. The contact zone 30 may allow increased mixing of the reaction mixture or increased residence time in the reactor in order to increase reaction efficiency.

Figure 3:
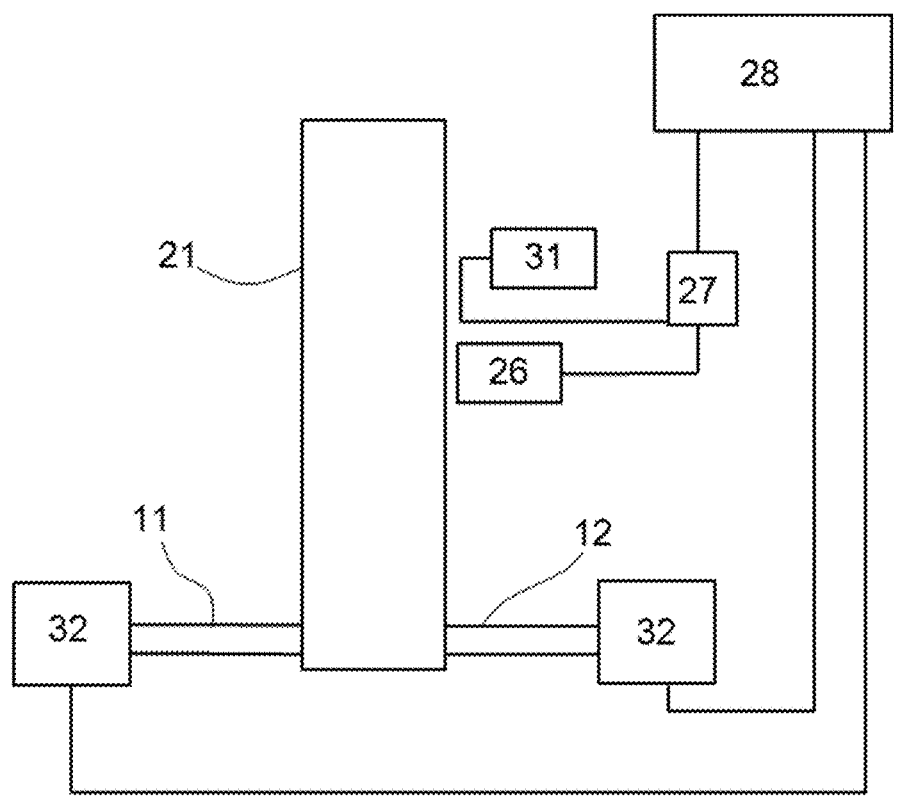
FIG. 3 shows an embodiment of a system for detecting reactor sounds and ambient sounds.

FIG. 3 shows an embodiment in which the first feed line 11 and the second feed line 12 feed solutions into the reactor 21. The sound sensor 26 may be connected to a signal processor 27 which is connected to a PLC 28. An ambient sound sensor 31 may be directed away from the reactor 21. The PLC 28 may be in communication with chemical feed controls 32.

Figure 5:
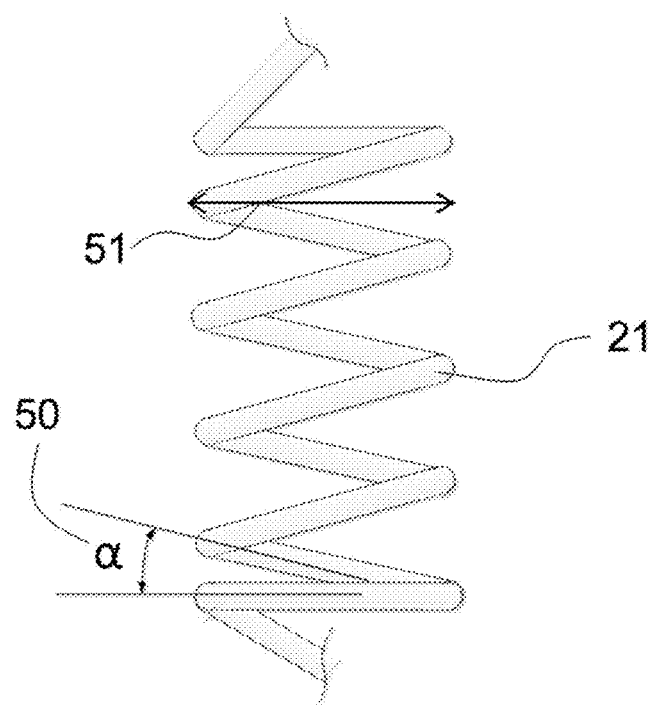
FIG. 5 shows an embodiment of a coiled reactor.

FIG. 5 shows an embodiment in which the reactor 21 may comprise a coiled configuration. The reactor having a coiled configuration may include a coil plane angle 50 ranging from about 5 to about 30 degrees. The reactor having a coiled configuration may include a coil diameter 51. The coil diameter may range from about 0.1 inch to about 4.0 inches. The inner diameter of the coil reactor may be as described above for the reactor.

Figure 6:
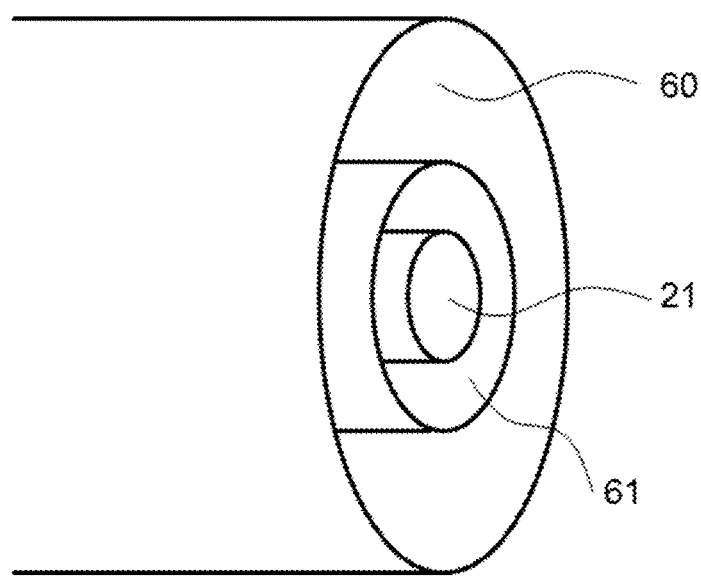
FIG. 6 shows a cross-sectional view of an embodiment of the motive water line and the reactor.

FIG. 6 show an embodiment in which the motive water line comprises an outer channel 60 and an inner channel 61. The reactor 21 may be disposed within the lumen of the inner channel 61. In this configuration, the motive water may be fed into the motive water line via two separate channels. The outer channel 60 and inner channel 61 may carry motive water at difference flow rates. The motive water in the outer channel 60 may have a different temperature than the motive water in the inner channel 61.

EXAMPLES

Example 1

Figure 4A:
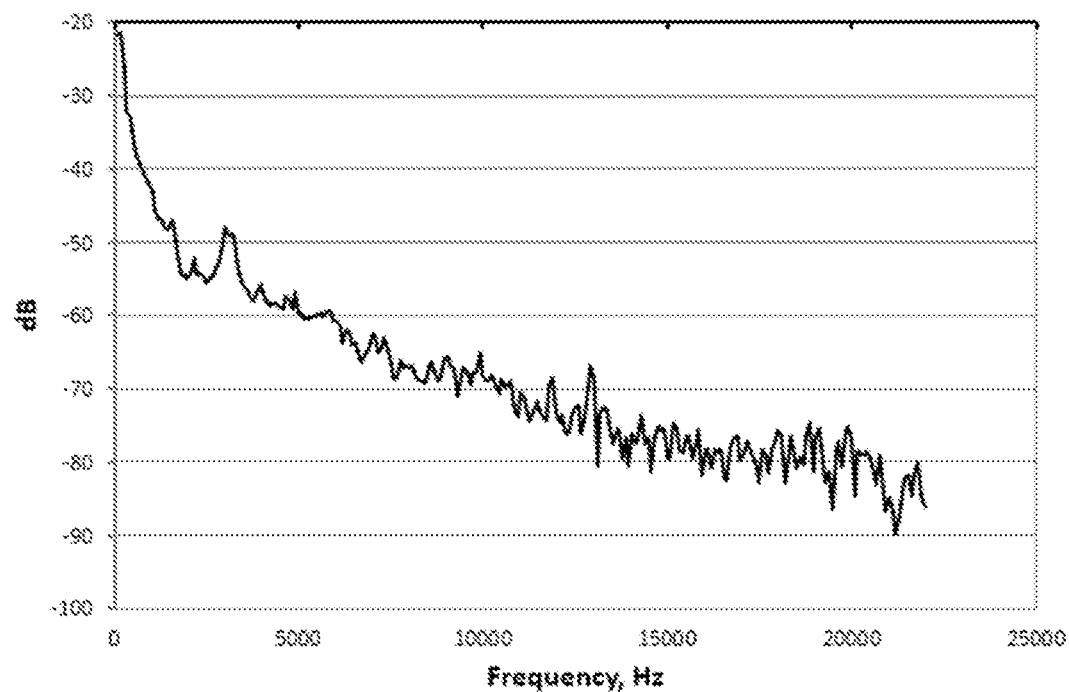
FIGS. 4A and 4B show sound signals from producing chlorine dioxide.

FIG. 4A shows a sound profile of chlorine dioxide reaction that is undergoing a decomposition event. In this graph, the time series representation of the sound of a reaction event was converted into the equivalent frequency representation using a Fast Fourier Transform (FFT). All time series may be represented in the "frequency domain" in this way. Anyone skilled in acoustics or digital signal processing is aware and will routinely use alternative representations.

The frequency representation can be used to discover the frequency characteristics of the reactor event. As shown in FIG. 4A there are peaks and valleys along the frequency curve. The peaks possess a specific power as indicated by their y axis height position.

Reaction events can be identified by the power of a peak. Once the peaks and powers are identified, a reaction event can be identified and confirmed. Under normal reactor operation, peaks are generally less compared to when a reaction event occurs. Comparison between normal operation frequency spectrum and event spectrum allows the identification of distinctive frequencies that are characteristic of a specific reactor sound event.

For example, during operation, the FFT is routinely performed on the sound time series (e.g. every 1/10 second) if during that interval the frequencies identified as belonging to the reaction event are evident, appropriate control action may be taken. If during subsequent measurement intervals the event frequencies with their concomitant powers are not evident, then the system is operating normally and no further control action is taken.

Figure 4B:
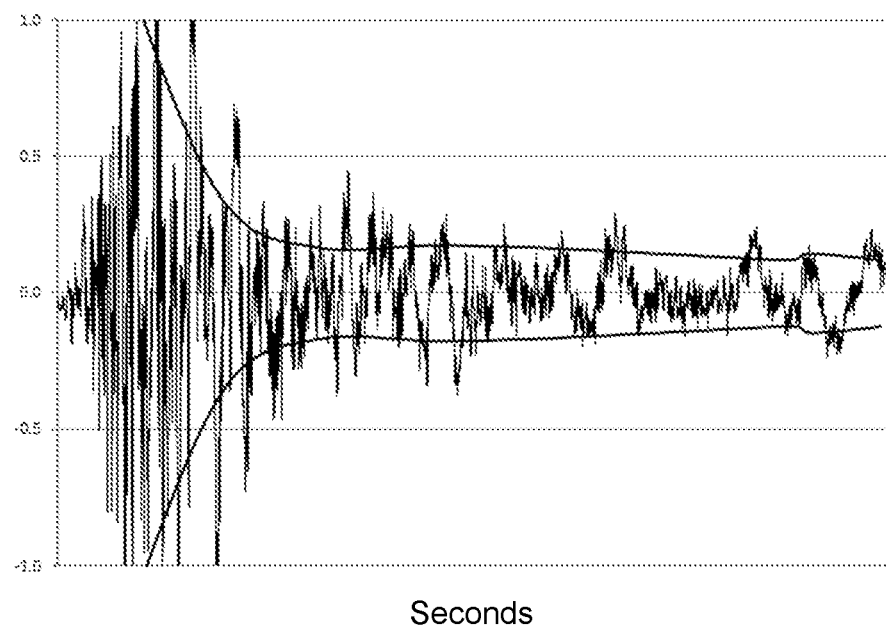

FIG. 4B shows the upper and lower envelopes for a discontinuing chlorine dioxide reaction in a coiled reactor. The decomposition event was recorded by a dual sound sensor system. The graph showed a loud decomposition sound followed by multiple scaled down continuous decompositions.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the apparatuses and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a feed line" is intended to include "at least one feed line" or "one or more feed lines."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of controlling a chemical reaction comprising:
   (i) feeding a first solution and second solution into a reactor, the first solution having a first first-solution flow rate and the second solution having a first second-solution flow rate;
   (ii) detecting a chlorine dioxide decomposition event sound in the reactor using a sound sensor that is adjacent to the reactor, wherein the sound sensor converts the chlorine dioxide decomposition event sound into an event sound signal;

(iii) converting the event sound signal to an event frequency spectrum; and/or calculating an event envelope signal of the event sound signal;

(iv) identifying a chlorine dioxide decomposition event by comparing one or more of the event frequency spectrum or the event envelope signal to a stored sound signal; and (v) adjusting the first first-solution flow rate to a second first-solution flow rate and/or the first second-solution flow rate to a second second-solution flow rate to mitigate the chlorine dioxide decomposition event, wherein:

the first solution comprises an acid;

the second solution comprises chlorate, chlorite, hydrogen peroxide, or a combination thereof; and the stored signal comprises a stored frequency spectrum having one or more frequencies and peak powers characteristic of a chlorine dioxide decomposition event and/or a stored envelope signal characteristic of a chlorine dioxide decomposition event.

2. The method of claim 1, wherein comparing the event envelope signal to the stored envelope signal comprises:

calculating a slope of the event envelope signal to produce an event envelope slope;

calculating a slope of the stored envelope signal to produce a stored envelope slope; and comparing the event envelope slope to the stored envelope slope.

3. The method of claim 1, wherein a detecting portion of the sound sensor is not in contact with the reactor.

4. The method of claim 1, further comprising:

detecting ambient sound around the reactor using an ambient sound sensor, wherein the ambient sound sensor converts the ambient sound into an ambient sound signal; and correcting the event sound signal by removing the ambient sound signal from the event sound signal.

5. The method of claim 4, wherein a detecting portion of the ambient sound sensor is directed away from the reactor.

6. The method of claim 1, wherein the acid is hydrochloric acid or sulfuric acid.

7. The method of claim 1, wherein the reactor produces chlorine dioxide.

8. The method of claim 1, wherein the reactor is a plug flow reactor.

9. The method of claim 1, wherein the reactor comprises:

a mixing device;

a first feed line in fluid communication with the mixing device;

a second feed line in fluid communication with the mixing device; and a reactor comprising a proximal portion in fluid communication with the mixing device and a distal portion in fluid communication with a motive water line;

wherein the mixing device, the reactor, a portion of the first feed line, and a portion of the second feed line are positioned within the motive water line.

10. The method of claim 9, wherein the reactor comprises a coiled configuration having a coil plane angle of about 1 degrees to about 60 degrees.

11. The method of claim 9, wherein the first feed line and the second feed line are opposite to and directed against each other.

12. The method of claim 9, wherein a flow rate of the motive water line is sufficient to dilute the chlorine dioxide to a concentration less than about 3,000 ppm.

13. The method of claim 1, wherein identifying a chlorine dioxide decomposition event comprises comparing the event frequency spectrum to the stored frequency spectrum.

14. The method of claim 1, wherein identifying a chlorine dioxide decomposition event comprises comprising comparing the event envelope signal to the stored envelope signal.

15. The method of claim 1, further comprising feeding a third solution into the reactor, wherein the third solution comprises water and the third solution has a first third-solution flow rate.

16. The method of claim 7, further comprising adjusting the first third-solution flow rate to a second third-solution flow rate to mitigate the chlorine dioxide decomposition event.

17. The method of claim 1, wherein the stored sound signal further comprises a decibel threshold from about 40 dB to about 120 dB.

* * * * *